United States Patent [19]

Ohta

[11] Patent Number: 4,687,912
[45] Date of Patent: Aug. 18, 1987

[54] BAR CODE READING METHOD AND APPARATUS

[75] Inventor: Masataka Ohta, Kanagawa, Japan

[73] Assignee: Kabushiki Kaisha Sato, Japan

[21] Appl. No.: 815,818

[22] Filed: Jan. 2, 1986

[30] Foreign Application Priority Data

Jun. 6, 1985 [JP] Japan ................................ 60-121570

[51] Int. Cl.⁴ .............................................. G06F 7/10
[52] U.S. Cl. .................................... 235/463; 235/462
[58] Field of Search ............................... 235/412, 463

[56] References Cited

U.S. PATENT DOCUMENTS 4,411,016 10/1983 Wakezand ........................... 235/463

Primary Examiner—Harold I. Pitts
Attorney, Agent, or Firm—Ostrolenk, Faber, Gerb & Soffen

[57] ABSTRACT

Bar code reading method and apparatus which is insensitive to scanning speed and to minor variations in width, caused by inaccurate printing, between like bars and spaces and which is suitable in particular to hand held manual scanners. The width of all the bars and spaces in a bar code are measured and stored in a memory. Selected ones of the stored measured width values are summed up to provide one or more sum values. For each bar and space whose binary status "0" or "1" is to be determined, a respective quotient is generated by dividing one of the stored sum values by the measured width of the bar or space whose binary status is being determined. The quotient, thus obtained, is compared to a prestored reference constant and on that basis the binary status of the bar or space is ascertained.

20 Claims, 15 Drawing Figures

BAR CODE READING METHOD AND APPARATUS

BACKGROUND OF THE INVENTION

1. Field of the Invention

The present invention relates to a method of reading bar codes and an apparatus therefor, and more particularly to a bar code reading method and apparatus which are unaffected by the speed at which the bar code is scanned.

2. Background Description

Many different types of bar codes are known. FIGS. 12 to 15 show several typical bar codes. Specifically, FIG. 12 shows a bar code which is composed of thin and thick printed bars and thin and thick spaces. Thick bars and spaces represent binary "1" whereas thin bars and spaces represent binary "0".

FIG. 13 depicts a bar code which is composed of thin and thick printed bars but only thin spaces. Thick bars represent binary "1", and thin bars represent binary "0"; spaces, however, have no significance as data.

FIG. 14 shows a bar code which is composed of thin and thick spaces and thin printed bars. Thick spaces represent binary "1", and thin spaces represent binary "0", while the bars have no significance as data.

Finally, FIG. 15 shows a bar code of the J.A.N., UPC and WPC types. In this bar code a numerical character is composed of seven elements or bits of equal width. A given element may be a bar (dark) or a space. The various possible combinations of the seven elements is such that they form two bars and two spaces. The element which occupies a bar area represents binary "1" whereas each space area represents binary "0". Thus, for example, a very thick bar can be used to represent a series of three "1"s which follow one another, without separation spaces therebetween.

The portions of the bar code marked CS in FIGS. 12 and 13 represent an inter-character space and not data per se. No inter-character spaces, however, appear in FIGS. 14 and 15.

Different methods have been employed for reading bar codes. A first reading method comprises the steps of scanning the code pattern with an optical reader and generating a numerical count while each bar and space is being scanned to provide a measure of the bar's or space's width. The obtained counts are compared to a fixed reference value to determine the binary digit which it represents.

A second reading method appropriate for reading a bar code as shown in FIG. 12 comprises the steps of: scanning the bar code to obtain bar and space width counts sequentially, comparing the count of the bar read first by the optical reader with the count of the space adjacent to the first bar to determine the binary digit represented by the first bar. Or, similarly, the count of the space width which is read first is compared to the count of the adjacent bar to determine the binary digit represented by the space, and so on.

The first reading method uses a fixed reference value. However, the count of a bar or a space varies with the speed at which the optical reader scans the bars and spaces. Therefore, the speed at which the optical reader scans the bar codes must be maintained within given limits. If not, reading errors will occur. Such reading errors are common with manual sweeping.

The second reading method is disadvantageous in that it cannot be used to read a bar code as shown in FIG. 15. In the bar code of FIG. 15, the counts of bars and spaces are sequentially compared with each other to determine the binary digits they represent. Therefore, if the printing should be somewhat blurred, an incorrect count will be generated.

In an attempt to solve these problems, a reading method which is deemed to be most appropriate for reading the bar codes of the type shown in FIG. 12 has been proposed in Japanese Laid-Open Patent Application No. 57-34540 (Patent Application No. 47-113058). According to the proposed method, bars are compared to each other. Likewise, spaces are compared to each other. Thus, counts of two subsequent bar widths are compared to each other to determine which one is larger, the wider bar (larger count) being deemed to represent binary "1" whereas the narrower bar (lower count) is deemed to represent binary "0". Likewise, two subsequent spaces are compared to each other to determine which one is larger in value. The larger one (or wider space) is deemed to represent binary "1" whereas the smaller one (or thinner space) is deemed to represent binary "0".

The proposed method, however, requires subsequent bars (or spaces) to have different widths. In order to meet this requirement, a variety of bar and space widths must be used. This, however, places limits on optimizing bar density and simplicity. In an attempt to solve this problem, the inventor of Application No. 57-34540 referred to above has proposed in another invention (Japanese Patent Application Laid Open No. 55-49354; Patent Application No. 48-34732) an alternate approach. The newest proposal may be applied to a bar code composed of bars (or spaces) of equal width to determine binary digits represented by bars (or spaces) with greater accuracy.

Specifically, according to this method, the bar (or space) at the first location of the bar code will be referred to as the standard bar and its width will be referred to as a first value. The next bar (or space) will be referred to as the object bar (or space) and a second value will be defined which equals the width of the object bar (or space) multiplied by a constant K which is greater than 1. A third value is generated which is calculated by taking actual value of the object bar and dividing it by the constant K. Then a determination as to whether the object bar (or space) represents a "0" or a "1" is made as follows:

(1) if the first value is larger than the second value, the object bar (or space) is thin, representing binary "0";

(2) if the first value is smaller than the third value, the object bar (or space) is wide, representing binary "1"; and (3) if the first value is smaller than the second value but larger than the third value, the object bar appears to be equal in width to the standard bar (or space), and the determination whether the object bar (or space) represents a "0" or a "1" is deferred until a comparison of the counts of the next bar and space widths is completed.

This last reading method, which is a combination of the previous two reading methods is free of the disadvantage of having to control the sweeping speed of the optical reader.

It does, however, have the following fault:

Let it be assumed that the width ratio of the thin bar (or space) to a thick bar (or space) is equivalent to 1:2, and that the value for the constant "K" is 1.5. Let it further be assumed that the thick bar is somewhat blurred or defective so that the actual width ratio is equal to about 1:1.4. In this case, the first value $N=1$; the second value equals $1.4NK=2.10N$; and the third value $=1.4N/K=0.93N$, where "N" stands for the value of the width at the ratio of one. In the example given above the second bar (or space), namely the object bar, is wider than the standard bar (or space). According to the method described above one should obtain the result: second value>third value>first value. Instead in this case an erroneous result is obtained that: second value>first value>third value. The same error appears in respect of spaces. Also disadvantageously, the third reading method can not be applied to a bar code as shown in FIG. 15, as is the case with the second reading method.

A reading method which is exclusively applied to a bar code of FIG. 15 comprises the steps of: obtaining a value corresponding to the width of a single element or bit by scanning a start bar (not shown) with an optical reader, and making a decision as to where each subsequent bit is located on a bar or on a space. This determines whether the bit is a binary "1" or "0".

This reading method, however, again requires constant speed scanning, producing erroneous readings with manually movable optical readers.

Therefore, all the known reading methods are unsatisfactory in one respect or another.

SUMMARY OF THE INVENTION

It is an object of the present invention to provide a bar reading method which does not require constant speed scanning while still assuring correct readings irrespective of slight variations in width from one bar or space element to another.

It is another object of the present invention to provide an apparatus for effecting the above object.

According to the present invention, a comparison reference value is calculated from the bar and space data itself. The width of each bar (space) or zone or section of a bar (space) in conjunction with a given constant are used for generating the reference values. Each measured value is compared to the comparison reference value. Finally, the width of each zone is determined by determining which value is larger, the zone value or the comparison reference value.

The foregoing and other objects and advantages of the present invention will be understood from the following description which is made with reference to the accompanying drawings.

DESCRIPTION OF PREFERRED EMBODIMENTS

Figure 1:
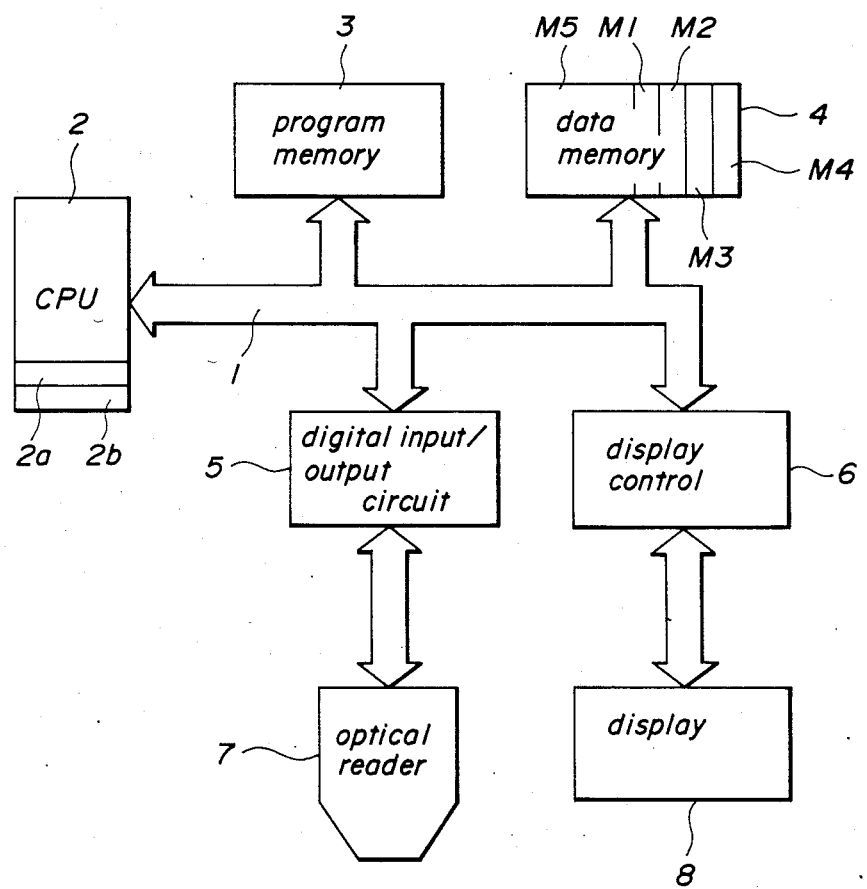
FIG. 1 is a block diagram of a bar code reading apparatus according to the present invention.

Referring to FIG. 1, a bar code reading apparatus according to the present invention comprises a CPU (central processing unit) 2, a program storage 3, a data storage 4, a digital input and output circuit 5 and a display control 6, all of which are linked together by a bus 1. CPU 2 is intended to control the operation of the entire apparatus in accordance with a program stored in program storage 3 which preferably is a read-only memory. The data storage 4 is a RAM (random access memory), which is divided into a zone width memory M1, a total memory M2, a read-out data memory M3, a temporary memory M4 and a miscellaneous memory M5.

An optical reader 7 which is movable, by hand, across bar codes is connected to the digital input and output circuit 5. The circuit 5 is adapted to detect whether the optical reader is moving across a bar zone or space zone and to supply to the bus 1 a binary signal representing the given zone. The display control 6 translates bar code data retrieved from the read-out data memory M3 into a corresponding display data, and supplies the data to a cathode-ray tube or any other suitable display means 8.

The method of reading bar codes with the aid of the reading apparatus is now-described.

The bar codes appearing in FIGS. 12 to 15 illustrate several different bar code standards. As previously described, different recognition methods are employed to read and convert each bar standard to the characters which they represent. First, let it be assumed that the bar code of FIG. 12 contains a required number of characters, for example the same number as in FIG. 11. The bar code is composed of combinations of thin and thick bars and thin and thick spaces. Also, let it be assumed that the width ratio between thin bar, thick bar, thin space and thick space is 1:3:2:4.

Figure 2:
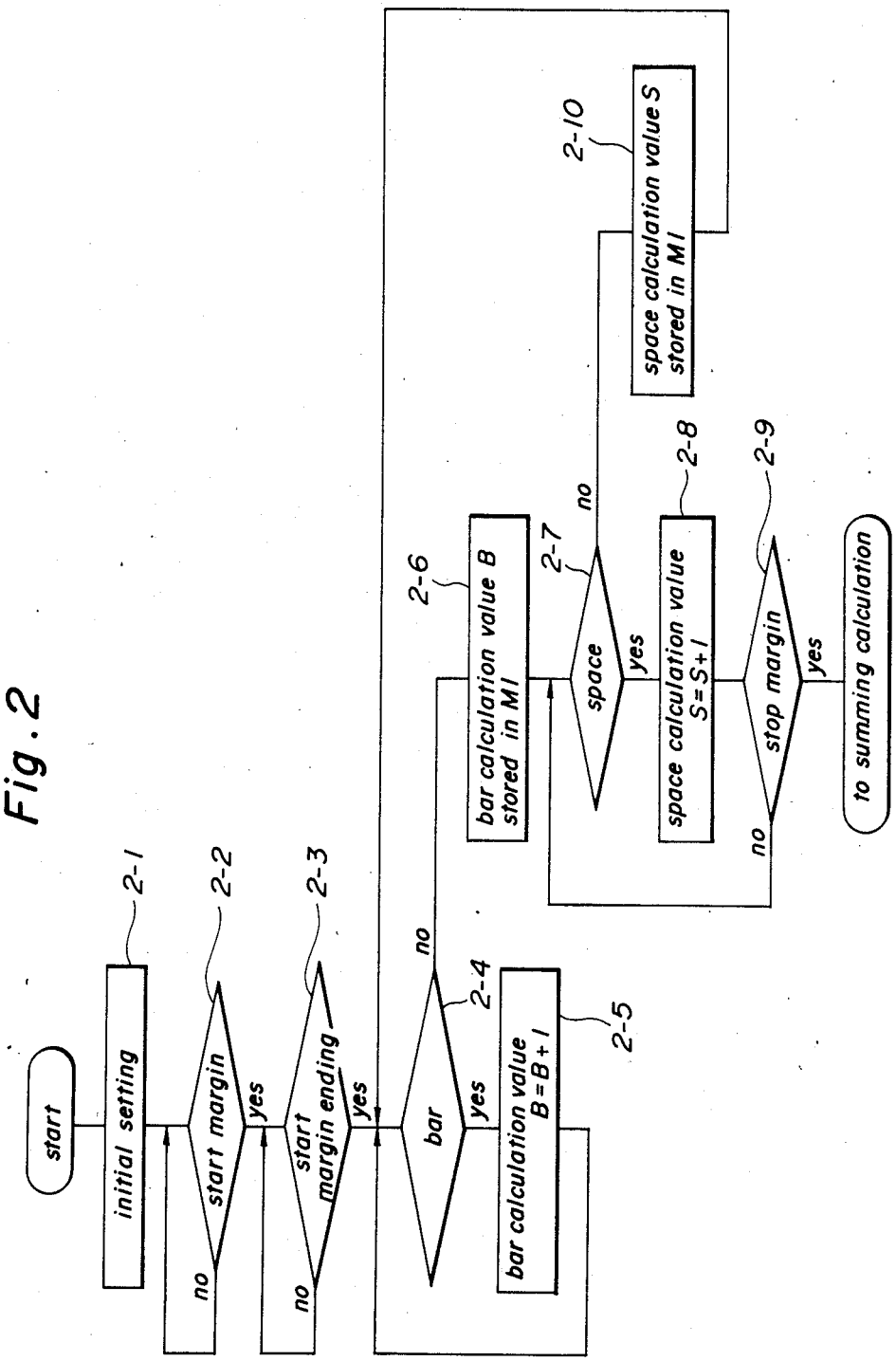
FIG. 2 is a flowchart showing the counting process.

FIG. 2 is a flowchart showing the sequence of steps for measuring and storing the width of each bar or space. Basically, CPU 2, or suitable circuits such as counters (not shown) begin a count during the beginning of a bar or space and end the count at the end thereof. The count value varies with the width of the space or bar and is used to represent it. As part of the process, the count values are stored in a data storage memory.

The following steps are carried out typically. First, each unit appearing in FIG. 1 is set to a respective initial condition, as shown at box 2-1 of the flowchart. The program then waits until the optical reader 7 has finished traversing the blank space corresponding to the start margin L1 (decisional boxes 2-2 and 2-3). At Steps 2-4 and 2-5, the optical reader 7 is scanning a given bar, and one is added to the count in register 2a of CPU 2. As long as the optical reader is still scanning the first bar BA1, Steps 2-4 and 2-5 are repeated so that the count is incremented once in every predetermined time period. Thus, the width of the first bar BA1 is established. When the scan of the first bar BA1 has ended, the bar count is transferred from register 2a to zone width memory M1, as shown at 2-6. Thereafter, register 2a is cleared.

Next, it is determined whether the optical reader is traversing a space. If yes, one is added to the space count which is kept in register 2a. It is determined whether space count has reached a value corresponding to the stop margin L2 shown in FIG. 11. If not, Steps 2-7 to 2-9 are repeated, thereby developing a count which represents the width of the first space SP1. At the end of the first space SP1, the space count S is shifted from register 2a to zone width memory M1 and register 2a is cleared. Then the program returns to Step 2-4.

By going through the flowchart of FIG. 2 several times, the widths of the second and subsequent bars BA2, BA3 . . . are determined and the corresponding counts are stored in the zone width memory M1. Similarly, the width of the second and subsequent spaces SP2, SP3 are determined and the respective count values are stored in the zone width memory M1. Thus, count values representing bar and space zone widths of the entire bar code pattern are stored. When optical reader 7 encounters the stop margin L2, the scanning of the bar code is deemed to have ended, and calculation of "sum values" follows. It should be noted that since the same count value for a bar or a space must represent identical widths, in timing a bar a dummy step (i.e., a no-operation step) may be included at 2-5 to assure that the same number of program steps are present in the loop of steps for timing a bar as appear in timing a space.

Figure 3:
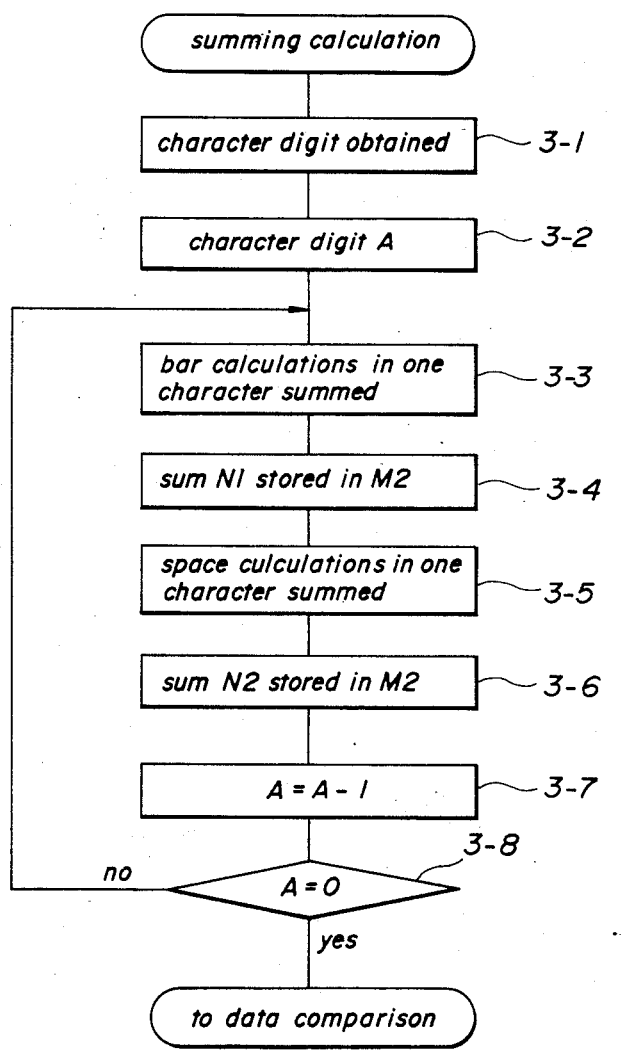
FIGS. 3, 6, 7 and 9 are flowcharts showing the generation of the comparison reference values.

At the conclusion of the counting operations, the values representing the bar and space widths are stored in the zone width memory M1. Then the value of a first digit A from the set of characters or digits which constitute the entire bar code is determined at Step 3-1 in FIG. 3. By convention, the value of digit A is always set to the number of characters in the entire bar code. This digit is stored at a predetermined address of memory M5.

The general concept of the present invention is to generate sum values (sometimes referred to as "total values"). Each sum value is generated by summing the measured values of several selected bars and/or spaces. Which values are added varies according to several embodiments of the present invention. Then a respective quotient value is generated for each bar or space by calculating the ratio of the measured value of that bar or space to one of the sum values. Finally, the respective quotient is compared to a stored reference value and on this basis a binary status determination is made. A detailed description follows beginning with a first embodiment.

Counts of the four bars contained in the first character are totaled, and that total or sum value N1 is stored in total memory 2. Next, the counts of the three spaces associated with the first character are totaled, and another total value N2 is stored in total memory 2.

After total values N1 and N2 are evaluated, the actual value of the first character A is determined. It will be remembered that A denotes the total number of characters in the entire bar code. Since A is one of those characters, its value is decreased by one to obtain a count of the other remaining characters in the bar code. In fact, digit A is decremented each time a character has been processed. Each time a decision is made whether digit A equals zero. If not, Steps 3-3 to 3-8 are repeated to calculate total values pertaining to the bars and spaces associated with each of the subsequent characters. The total values thus determined are then stored in reference memory M2. If, however, digit A is zero, the calculation of the total values is deemed to have been completed and comparisons of read-out data to the total values follows.

Figure 4:
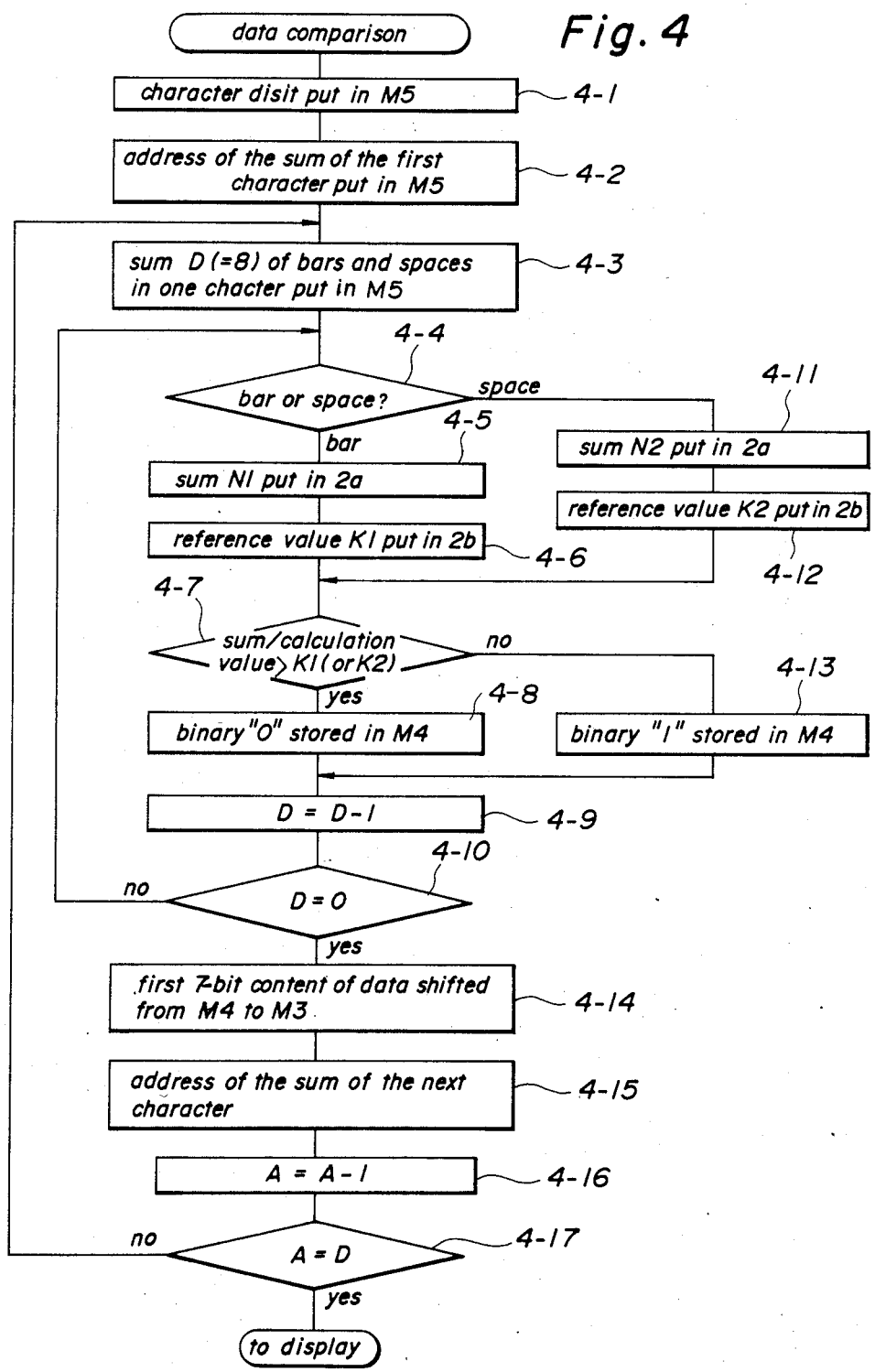
FIGS. 4, 8 and 10 are flowcharts showing the readout data comparison process.

Next, a respective quotient for each bar and space is found as is described below with reference to FIG. 4. FIG. 4 also describes the steps which involve comparisons of the quotients to prestored reference values.

First, at Step 4-1, the digit A and the addresses of memory M2 where N1 and N2 of the first character are stored are shifted to memory M5. Then, at step 4-3, the sum of bars and spaces in the first character, designated D (8 in this case) is stored in a predetermined address of memory M5. As seen from FIG. 12, the number of bars and spaces is actually 7. The additional space which raises the total to 8 is the inter-character space CS.

At Step 4-4, a determination is made whether the first count stored in zone width memory M1 relates to a bar or a space. If it is found to relate to a bar, N1 of the given character is shifted from memory M5 to register 2a in CPU 2. At Step 4-6 a bar reference value K1, previously stored in memory 3, is transferred to register 2b of CPU 2. Next, at Step 4-7, N1 of the first character is divided by the bar count of bar BA1. The resulting quotient is compared to reference value K1. If the quotient is larger, the first bar represents binary "0".

If the quotient is smaller than reference value K1, the first bar is a "1". The binary value "1" or "0" for the first bar is stored in temporary memory M4. In the example given in FIG. 12 the first bar BA1 is thin, and therefore the quotient is larger than reference value K1. Thus, a binary "0" will be stored for the first bar.

Then D is decremented by one and the result compared to zero. If not zero, the set-up reverts to Step 4-4. Then, the address of memory M5 at which total N2 of the spaces associated with the first character is stored is referred to, and N2 is shifted to the register 2a of CPU 2.

Figure 12:
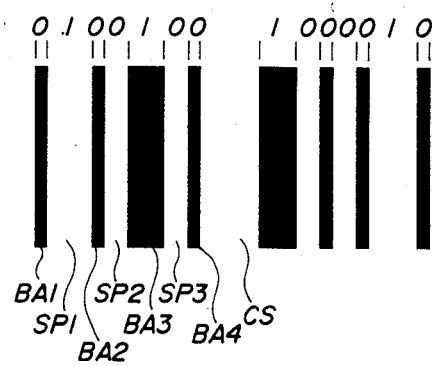
FIGS. 12, 13, 14 and 15 show a variety of bar codes.
Figure 13:
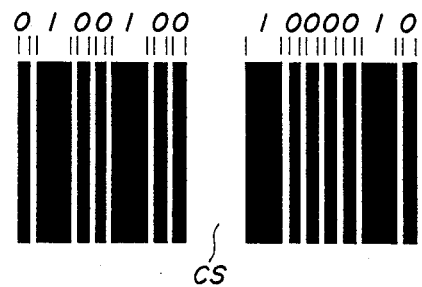

Thereafter, a space reference value K2 is shifted from program memory 3 to register 2b of CPU 2 at Steps 4-12. Then, total N2 is divided by the space count (width value) of the first space SP1. The quotient is compared to reference value K2. If the quotient is larger, the first space represents binary "0". Otherwise, the first space is a binary "1". The result, binary "0" or "1", thus determined is stored in temporary memory M4. In FIG. 12, the first space SP1 is wide, and the quotient is not larger than reference value K2. Therefore, binary "1" is stored, and at the same time, one is subtracted from D before the set-up proceeds to Step 4-10. These proceedings are repeated to perform comparisons with respect to the bars, spaces and the inter-character space of the first character.

It should be noted that reference value K1 has a value intermediately between the quotient obtained by dividing bar total N1 by the thin bar calculation value and the quotient obtained by dividing the bar total N1 by the thick bar calculation value. Similarly, the reference value K2 is set to a value about intermediate between the quotient obtained by dividing space total N2 by the thin space calculation value and the quotient obtained by dividing the space total N2 by the thick space calculation value.

Figure 5:
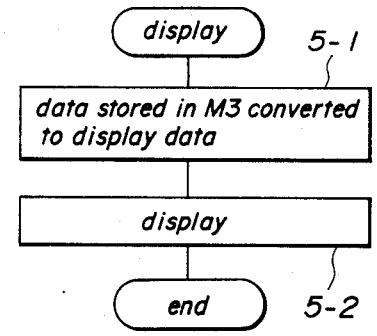
FIG. 5 is a flowchart showing the display operation process.

After finishing the bar and space data comparisons, D will be equal to zero at Step 4-10. At this time, a first seven-bit data byte has been generated for one character which data is stored in the temporary memory M4. That is, the content of the data of one character, excluding only the inter-character space, is stored in the read data memory M3. The address data of the totals of the first character are cleared at Step 4-15, and the address data of the totals of the subsequent character are put in the memory M5. Also, one is subtracted from the character digit A at Step 4-16. Then, character A is compared to zero at Step 4-17. If non-zero, Steps 4-3 to Step 4-17 are repeated, thereby performing comparisons with regard to the bar and space data of subsequent characters. The data obtained by these comparisons are stored in read data memory M3 in a predetermined order. The last character has no inter-character space CS, and therefore the total D of the numbers of the bars and spaces in the last character is seven. Therefore, the eighth binary bit of the last character determined at Step 4-7 has no significance. No problem is presented, however, because this eighth binary bit will be discarded at Step 4-1. When comparisons of the bar and space data of all the characters are completed and after the data thus obtained is stored, the character digit A will be equal to zero, and the display procedure begins In the display proceedings as shown in FIG. 5, data are retrieved, each seven-bit in length, from read data memory M3, and this data are converted to display data, which are stored in display control circuit 6. Then, a CRT or any other display device 8 is used to display the contents of the display data under control of display control circuit 6.

A second method for determining the binary state of each bar and space is described below by reference to a second example.

The second example differs from the first example only in the method by which total values are calculated. The width measurements, the data comparisons and the display operation are the same as described above with reference to FIGS. 2, 4 and 5. Therefore, the descriptions thereof are omitted.

To calculate N1 and N2, first the bar and space values of character A are stored in zone width memory M1, and the character digit A thus determined is stored in a predetermined address of memory M5. Then, the largest bar value MAX and the smallest bar value MIN are selected at Step 6-3. The largest and smallest bar values (MAX and MIN) are added at Step 6-4, and the total N1 is stored in total memory M2 at Step 6-5. Similarly, the largest space value MAX and the smallest space value MIN are selected at Step 6-6. Then, the largest and smallest space values (MAX and MIN) are added at Step 6-7. The total is stored in total memory M2 at Step 6-8.

Next, one is subtracted from the character digit A which is then compared to zero, at Step 6-10. If non-zero, Steps 6-3 to Step 6-10 are repeated, to calculate bar and space totals N1 and N2 for the second, third and subsequent characters. When the N1 and N2 values for all characters are obtained, the value of character digit A will be zero. Then, the data comparison described above with reference to FIG. 4 begins.

In the above example the largest and smallest bar or space values MIN and MAX are selected, and the totals N1 and N2 are calculated by totalling these largest and smallest calculation values. However, if a character consists of one thick element and three thin elements, the totals N1 and N2 may be determined by totalling the largest calculation value and one situated in a predetermined order with respect thereto.

In the first and second embodiments, bar- and space-total values N1 and N2 are calculated separately for each character. Alternatively, one value N1 and one value N2 can be used for the entire bar code. This calculation will be described below with reference to a third embodiment.

The basic calculations are the same as described with reference to FIG. 2 for the first and second embodiments.

Figure 6:
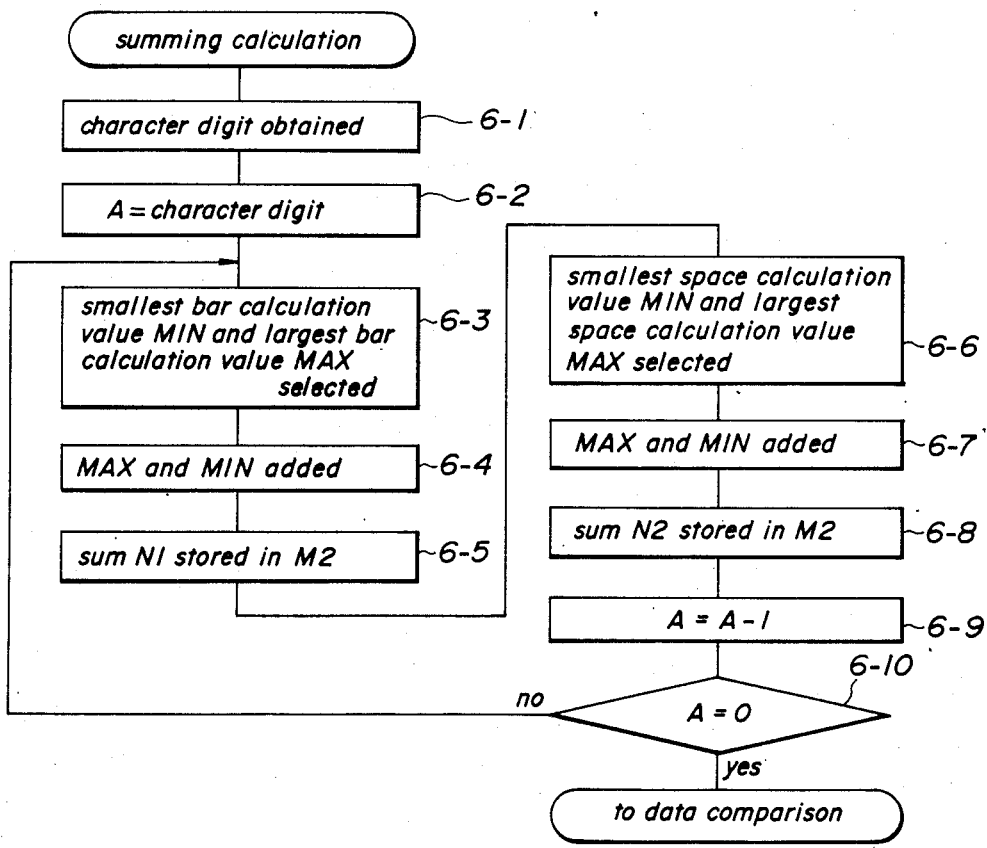
Figure 7:
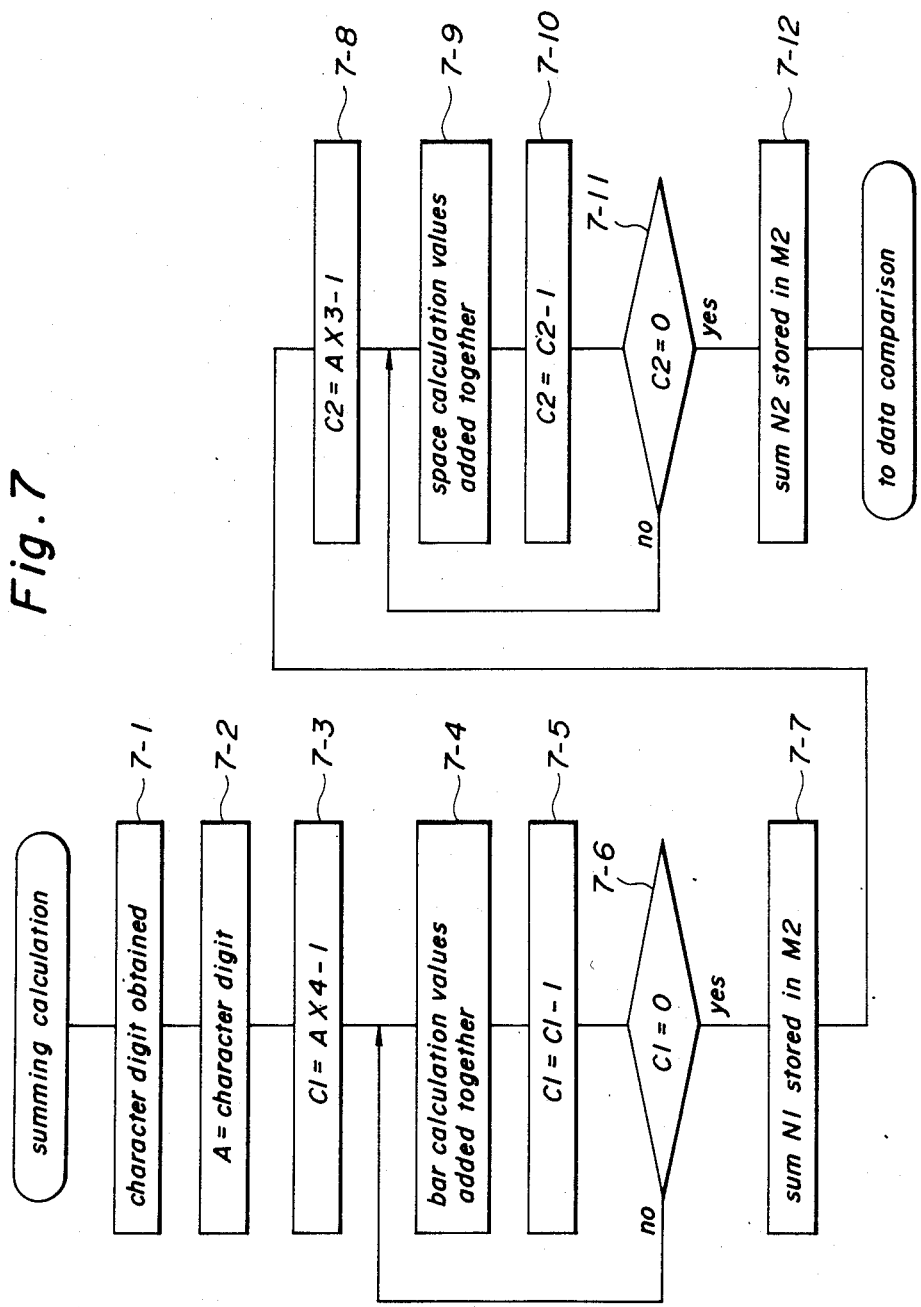

FIG. 7 shows the third totalling procedure. As is described above with reference to FIGS. 3 and 6, a character digit A is determined, and then it is stored in a predetermined address of memory M5. Next, at Step 7-3, character A is multiplied by the number of bars contained in one character (usually 4), and then one is subtracted from the product. This provides the number of additions C1, i.e., the total number of bars in the entire bar code. C1 is stored in memory M5.

At Step 7-4 the bar values of the first and second bars are added, and the total is stored in a predetermined address of memory M5. One is subtracted from the number of additions C1 and C1 is compared to zero, at Step 7-6. If not equal to zero, the width value of the next bar is added to the total calculated at Step 7-4. Steps 7-4 to Step 7-6 are repeated to add the bar values of the remaining bars in the bar code until C1 equals zero. When C1 is zero all the bar values will have been added and N1 is stored in total memory M2.

At Step 7-8 digit A is multiplied by 3, that is, the number of the spaces in each character, and one is subtracted from the product to provide a number of additions C2. C2 represents the total number of spaces or space values in the entire bar code. C2 is stored in a predetermined address of the memory M5.

Next, the space value of the first space and of the second space are added together. The total is stored in a predetermined address of the memory M5 at Step 7-9. Then, one is subtracted from C2 which is then compared to zero at Step 7-11. If not equal to zero, the set-up reverts to Step 7-9 so that the space values of the remaining spaces may be added to the total stored in the memory M5. Steps 7-9 to Step 7-11 are repeated until the space values of the entire bar code have been added. The sum is stored in a predetermined address of memory M5. At the end C2 will equal to zero. At that time total N2 is stored in total memory M2. Then, data comparison starts.

Figure 8:
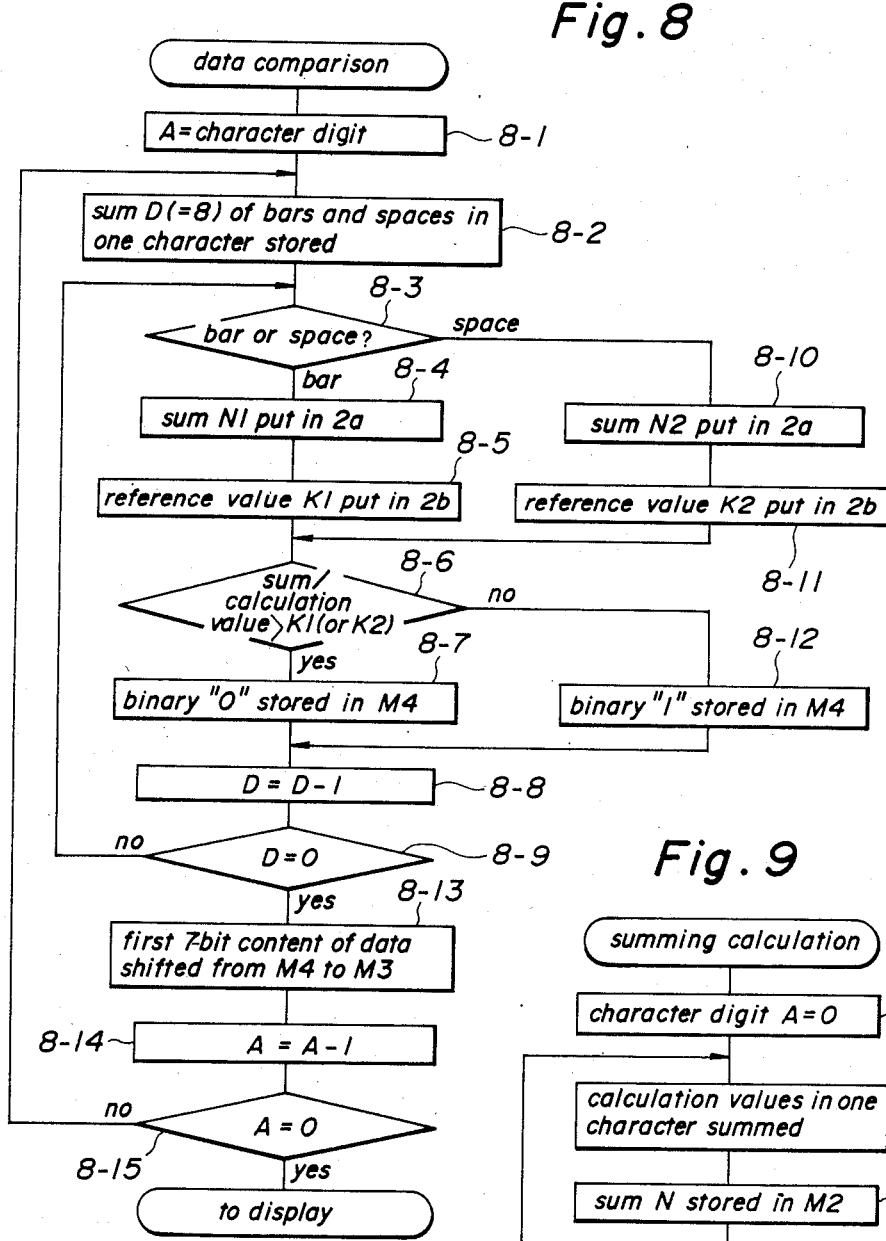

The data comparison in the third example is different from that in the first and second example, and is described below with reference to FIG. 8. First, character digit A is put in the memory M5. At Step 8-2 the numbers of the bars and spaces contained in one character and the number of the inter-character spaces are added together to obtain a total (=8) which is stored in a predetermined address of memory M5. Then, a decision is made as to which element the first calculation value stored in the zone width memory M1 represents, bar or space, at Step 8-3. If it represents a bar, bar total N1 is retrieved from total memory M2 and stored in register 2a of CPU 2. Next, at Step 8-5 bar reference value K1 is shifted from the program memory 3 to register 2b in CPU 2. Bar total N1 is divided by the actual bar value of the first bar BA1, and then the quotient is compared to bar reference value K1 at Step 8-6. If the quotient is larger, the first bar represents a binary "0". Otherwise, it represents a binary "1". In either case the result is stored in temporary memory M4.

Then, one is subtracted from D which is then compared to zero at Step 8-9. If non-zero, the set-up reverts to Step 8-3, where a decision is made whether the next calculation value stored in zone width memory M1 corresponds to a bar or to a space. If to a space, space total value N2 is shifted from total memory M2 to register 2a of CPU 2. K2 is moved to register 2b of CPU 2 at Step 8-11. N2 of the first character is divided by the value of the first space, and then a decision is made as to whether or not the quotient is larger than the reference value K2 at Step 8-6. If larger the space is deemed to represent a binary "0". Otherwise, it represents a binary "1". In either case the result is stored in temporary memory M4.

Figure 11:
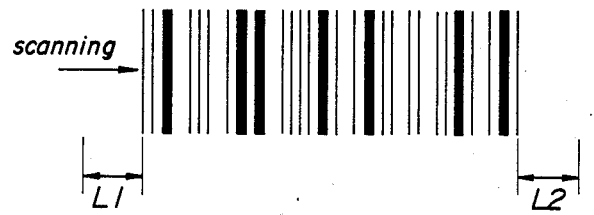
FIG. 11 shows an entire bar code.

In this manner all the bars and spaces in the entire bar code as shown in FIG. 11 are subjected to such comparisons one after another. It should be noted that reference value K1 is set about intermediate between the quotient obtained by dividing the bar total value by the actual value of the thin bars and the quotient obtained by dividing the bar total value by the calculation value of the thick bars and that the reference value K2 is set about intermediate between the quotient obtained by dividing the space total by the calculation value of the thin space and the quotient obtained by dividing the space total by the calculation value of the thick space.

At the end of all the comparisons for all the bars and spaces D equals zero. At Step 8-13 the contents of the first seven-bit data, obtained for the bars and spaces, excluding the inter-character space CS, of a given character, are stored in read data memory M3. Then, one is subtracted from the character digit A at Step 8-14. Next, digit A is compared to zero at Step 8-15. If non-zero, Steps 8-2 to Step 8-15 are repeated to carry out comparisons for the bars and spaces of the second, third and subsequent characters. When the comparison of all the bars and spaces in the entire bar are completed, A will be zero, and then the display procedure as described above with reference to FIG. 5, follows.

Figure 14:

In the first, second and third examples, the present invention is described as being applicable to reading a bar code composed of thin and thick bars and thin and thick spaces, wherein thin elements represent binary "1" and thick elements represent binary "0", as, for instance, shown in FIG. 12. The present invention, however, can be equally applicable to a bar code composed of thin and thick bars and thin (or thick) spaces (FIG. 13) and to a bar code composed of thin or thick spaces and thin (or thick) spaces (FIG. 14).

In case of a bar code composed of thin and thick bars and thin (or thick) spaces, the totalling of spaces and the comparison of space data may be omitted. Specifically, Steps 3-5 to Step 3-6 may be omitted in FIG. 3, Steps 6-6 to Step 6-8 may be omitted in FIG. 6, and finally, Steps 7-8 to Step 7-12 may be omitted in FIG. 7. As for the data comparison given in FIG. 4, Steps 4-4, 4-11, 4-12 and 4-14 may be omitted, and D is set at 7 at Step 4-3. At Steps 4-8 and 4-13 a binary "1" or "0" may be stored directly in the read data memory M3. As for the data comparison given in FIG. 8, Steps 8-3, 8-10, 8-11 and 8-13 may be omitted, and at Step 8-2 D is set at 7. A binary "1" or "0" may be stored directly in the read data memory M3 at Steps 8-7 and 8-12.

If the present invention is applied to reading a bar code composed of thin and thick spaces and thin (or thick) bars, the bar totalling and the bar data comparison may be omitted. Specifically, in the same way as for the space totalling and the space data comparisons these steps are omitted for a bar code composed of thin and thick bars and thin (or thick) spaces.

The present invention may be applied to a bar code composed of bars and spaces having three different widths by selecting two or more reference values beforehand, for instance as follows: a first reference value is set about intermediate between the value of the thin element and the calculation value (measured value) of the intermediate element, and a second reference value is set about intermediate between the calculation value of the intermediate thick element and the calculation value of the thick element. Then, in the data comparison, each elemental zone width is examined to determine which binary bit it represents by comparing it with the first and second reference values.

In the above examples thick and thin elements represent binary bits "1" and "0", respectively. Thus, the demarcation between bits is apparent. The present invention, however, can be applied just as well to a bar code in which each character is composed of seven modules each occupying a distinct location on the bar code. A bar code includes, for example, two bars and two spaces of different widths wherein the bar areas represent one or more binary "1s" and space areas represent one or more binary "0s" (see FIG. 15).

Figure 9:
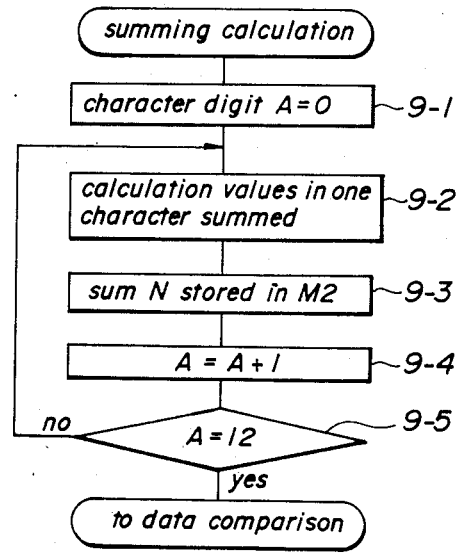
Figure 10:
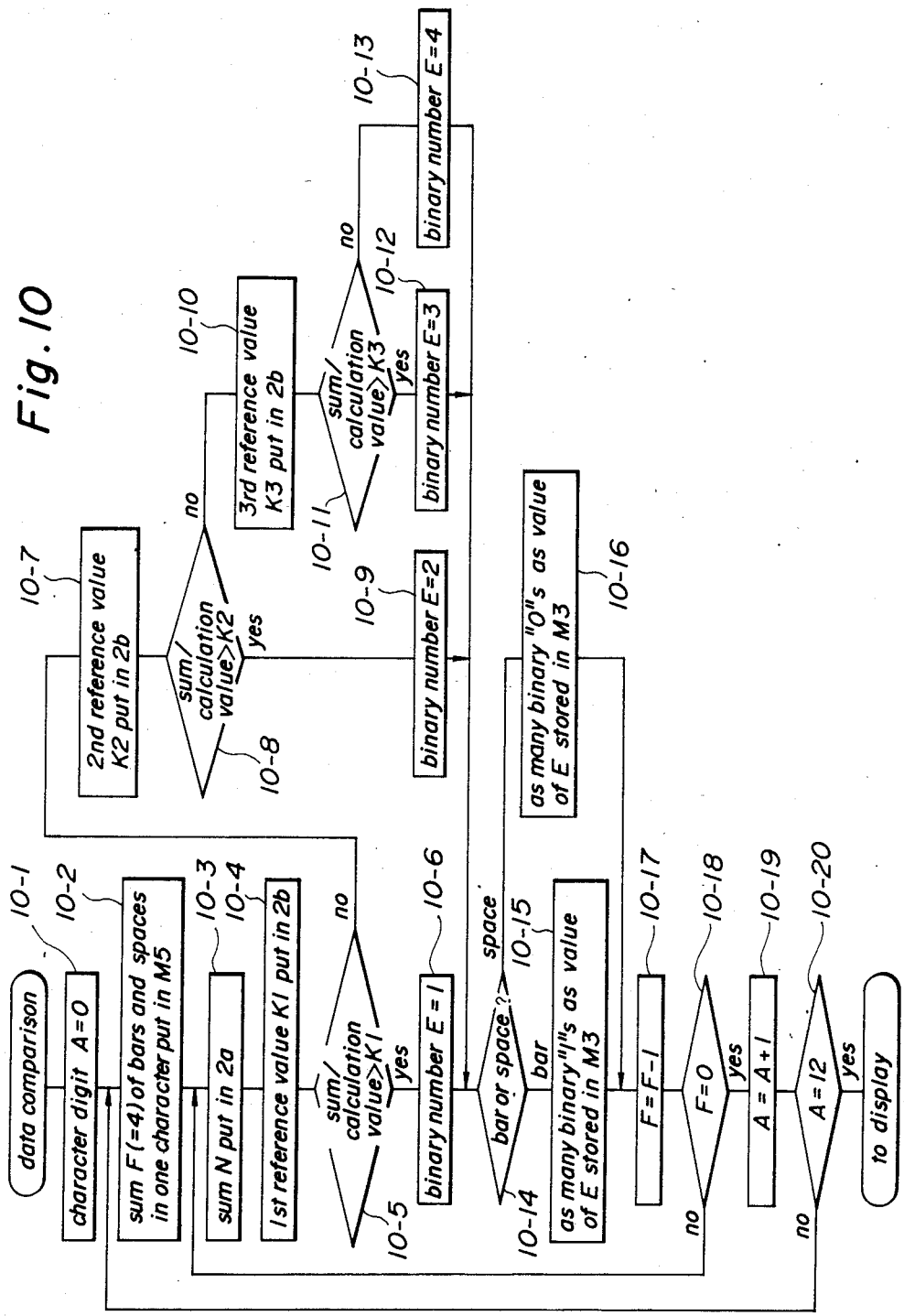
Figure 15:
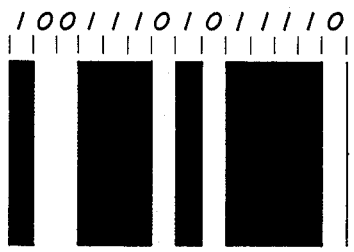

The manner of reading the bar code of FIG. 15 is described below with reference to FIGS. 9 and 10. It is assumed that a bar or a space may include up to four modules, i.e. bits.

The value i.e. width of each bar and space zone is calculated as described previously with reference to FIG. 2. The totalling calculation is conducted, and the character digit A (=0) is stored in a predetermined address of memory M5 at Step 9-1.

Next, the measured bar and space values of the first character are totalled at Step 9-2, and the total N is stored in total memory M2 at Step 9-3. Then, one is added to the character digit A, and A is compared to 12 at Step 9-5. It should be noted that the digit A is set to the fixed value of twelve, which value is stored in program memory 3 or read data memory 4, specifically memory M5. If the comparison shows that A is not equal to 12, the set-up reverts to Step 9-2, and the total N of the next character is obtained and stored in total memory M2. Likewise, the totals of the remaining characters are determined until eventually A increases to 12. Then, data comparison follows.

The data comparison is described below with reference to FIG. 10. First, A (=0) is stored in memory M5 at Step 10-1. On the other hand, a total F (=4) of bars and spaces in a single character is stored in a predetermined address of memory M5 at Step 10-2.

At Step 10-3 the total N of the first character is transferred to register 2a of CPU 2, and the largest reference value K1 is selected and shifted from program memory 3 to register 2b in the CPU 2 at Step 10-4. Thereafter, the total N is divided by the first calculation value stored in zone width memory M1, and the quotient is compared to the first reference value at Step 10-5. If the quotient is larger, the element is considered to be as wide as one module i.e. bit, and a binary number E equal to 1 is stored in a predetermined address of memory M5. Otherwise, if the quotient is not larger than the first reference value K1, the second reference value K2, i.e. the intermediate reference value, is stored in register 2b at Step 10-7.

Then, the quotient is compared to the second comparison value K2 at Step 10-8, and if larger the element is considered to be as wide as two modules. E will be equal to 2 and that value is stored in memory M5. If the quotient is not larger than K2, the smallest or third reference value K3 is transferred to register 2b.

At Step 10-11 the quotient is compared to K3. If the quotient is larger the element is as wide as three modules. E then equals 3 which value is stored in a location of memory M5. Otherwise, the element is deemed to be four modules in width and E=4 is stored in memory M5.

It should be noted that the value of the first reference value K1 is about intermediate between the quotient obtained by dividing the total by the measured value of the bar or space of one module and the quotient obtained by dividing the total by the value of the bar or space of two modules. Reference value K2 is set about intermediate between the quotient obtained by dividing the total by the measured value of the bar or space of two modules and the quotient obtained by dividing the total by the measured value of the bar or space of three modules. The third reference value K3 is about intermediate between the quotient obtained by dividing the total by the measured value of the three module wide bar or space and the quotient obtained by dividing the total by the measured value of the four module wide bar or space.

Next, at Step 10-14 it is decided whether a given measured value is associated with a bar or a space. If a bar, binary "1"s equal in number to E are stored in the read data memory M3. Likewise, if it represents a space, binary "0"s equal in number to E are stored in the read data M3.

Then, one is subtracted from the total F of bars and spaces, and F is compared to zero. If non-zero, Steps 10-3 to Step 10-18 are repeated, thereby performing comparisons of the calculation values of the bars and spaces remaining in the given character. At the end of a character, F is zero, and one is added to character digit A.

Thereafter, A is compared to 12 at Step 10-20. If non-zero, Steps 10-2 to Step 10-20 are repeated, thereby performing comparisons of the calculation values of the bars and spaces remaining in that character. When these comparisons are completed, the character digit A will equal 12. Then, the display proceeding given in FIG. 5 follows.

A bar code of the type shown in FIG. 15 must be printed clearly. In this connection any deviation of the binary element (bar or space) from its exact width is limited to a strictly prescribed ratio. Thus, in reading a bar code as shown in FIG. 15, both the bar and space calculation values may be totalled into a single total instead of separately totalling the measured bar and space values. Then, the composite total may be used in common in comparisons of the bar and space data. The common use of the composite total may be allowed in reading a bar code as shown in FIG. 12, provided that any deviation of each binary element from its exact width must not exceed a strictly prescribed ratio. Otherwise, if the printing should be somewhat blurred, the composite total cannot be used.

In the above described examples, whether a bar or a space represents binary "0" or "1" is decided by dividing a bar or space total by the measured value of the bar or space and by comparing the quotient thus obtained with a bar or space reference value. The same may be obtained, however, by dividing the measured value of a bar or space by the bar or space total and by comparing the quotient with an appropriate reference value, which will have a value different from those used in the above examples. The comparison relationships between the quotients and the reference value are just the reverse of those in the above examples.

A bar code reading apparatus according to the present invention may be designed to be usable for one, several or all the bar codes illustrated in FIGS. 12 to 15. In the latter case, the apparatus may be provided with means for determining which type of bar code is to be read. Then the apparatus may perform the totalling calculations and data comparisons as required according to the type of bar code at hand. An example of such means for determining which type of bar code is to be read, is a plurality of switches, each being associated with a particular bar code type. An operator may select a particular switch to indicate bar code type. Alternately, automatic determining means may be provided, capable of determining from features of the bar code itself such as a start or end code the type thereof.

As described above, an optical reader is moved across a bar code by hand to measure, calculate and store width values for each bar or space encountered; selected measured values are totalled together; the totals are divided by individual measured values; the quotients thus obtained are compared to reference values; and it is decided, based on the comparisons, whether a given element represents a "1" or a "0". Thus, a bar code can be read accurately, without regard to scanning speed or to inaccurate or blurred printing of the bar code.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A method for reading a bar code which includes a sequence of printed bars and spaces either or both of the bars and spaces having a prescribed number of different width standards associated therewith, comprising the steps of:

measuring the width of the bars and spaces and generating a respective width value for each one of the bars and spaces;

storing the width values in a memory;

calculating at least one total value which total value is obtained by summing a plurality of the width values; storing the at least one total value in the memory;

generating a respective quotient value for each one of the bars and spaces, the quotient value being a ratio between the at least one total value and the respective width value of the given bar or space;

comparing the quotient value to a predetermined reference value; and determining which of the width standards of the bars and spaces is associated with each given bar or space based on the result of the comparison.

2. A bar code reading method according to claim 1, wherein each of the bars and spaces represents at least one binary bit.

3. A bar code reading method according to claim 1, wherein the bar code is of the type wherein only the bars have at least two width standards.

4. A bar code reading method according to claim 3 wherein the at least one total value is derived by summing only those width values which are associated with the bars.

5. A bar code reading method according to claim 1 wherein the spaces have at least two width standards.

6. A bar code reading method according to claim 5 wherein the calculating of the at least one total value comprises summing only those of the width values which are associated with the spaces.

7. A bar code reading method according to claim 1 wherein both the bars and the spaces comprise at least two different width standards.

8. A bar code reading method according to claim 7 wherein the bar code is of the type in which at least three different width standards are associated with at least one of the bars and spaces.

9. A bar code reading method according to claim 8 further comprising the step of providing at least one more additional reference value and selectively comparing a respective quotient associated with a bar or a space having at least three width standards to the at least one additional reference value in order to carry out the determining step.

10. A bar code reading method according to claim 7 wherein the at least one total value comprises a single total value.

11. A bar code reading method according to claim 7 wherein the at least one total value comprises a first total value which is derived by summing those of the respective width values which are associated with bars and a second total value which is derived by summing those width values which are associated with the spaces.

12. A bar code reading method according to claims 4, 6 or 11 wherein the at least one total value includes a respective at least one total value provided for each of a plurality of characters associated with the bar code.

13. A bar code reading method according to claim 4, 6, 10 or 11 wherein the at lease one total value is derived by summing width values from the entire bar code and irrespectively of a character with which a given width value may be associated.

14. A bar code reading method according to claim 12 wherein each respective total value is calculated by summing two of the width values which appear in accordance with a predetermined order in a respective character.

15. A bar code reading method according to claim 13 wherein each respective total value is calculated by summing two of the width values which appear in accordance with a predetermined order in a respective character.

16. A bar code reading method according to claim 12 wherein the total values are derived by summing a maximum width value and a minimum width value selected from the width values associated with the bar code.

17. A bar code reading method according to claim 13 wherein the total values are derived by summing a maximum width value and a minimum width value selected from the width values associated with the bar code.

18. An apparatus for reading a bar code which includes a sequence of printed bars and spaces, either or both of the bars and spaces having at least two different width standards associated therewith, the apparatus comprising:
- an optical reader for scanning the bars and spaces of the bar code;
- means for generating width values, each width value comprising a count which is representative of the width of a respective bar or space, the generating means being coupled to the optical reader and including means for determining when the optical reader is scanning a bar or a space;
- a zone width memory for storing the width values;
- means for summing selected ones of the width values to generate at least one total value;
- means for generating a respective quotient value for each bar and space, the quotient value generating means being coupled to the memory and to the means for generating the at least one total value and including program means for generating the respective quotient values in the form of a ratio of a given one of the width values and the at least one total value;
- comparing means for comparing each respective quotient value to a predetermined reference value and means for determining which of the width standards for the bars and spaces is associated with the given bar or space based on the result of the comparison; and
- a data memory for storing therein the results of the comparisons.

19. The apparatus of claim 18 wherein each bar and space is representative of at least one binary bit and wherein the comparing means for determining the binary status of each bar and space comprises further program means stored in a memory.

20. The apparatus of claim 18 which comprises:
- a central processing unit and a data bus for communicating with the central processing unit;
- a program memory and a data storage memory coupled onto the bus;
- a digital input/output circuit for coupling the optical reader to the bar code;
- a display control circuit and a display unit for providing visual output of characters read by the apparatus; and
- a sequence of program instructions for use by the central processing unit which comprise the means for generating the total values and the quotient values.

* * * * *